Nov. 24, 1959   J. ORTUSI ET AL   2,914,761
RADAR SYSTEMS
Filed Nov. 14, 1952   2 Sheets-Sheet 1

INVENTORS
JEAN ORTUSI & ANDRE ROBERT
By Haseltine, Lake & Co.
AGENTS

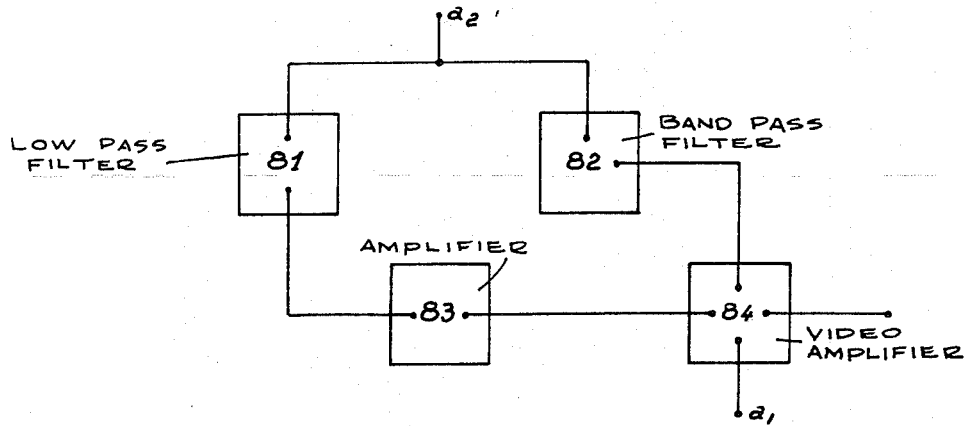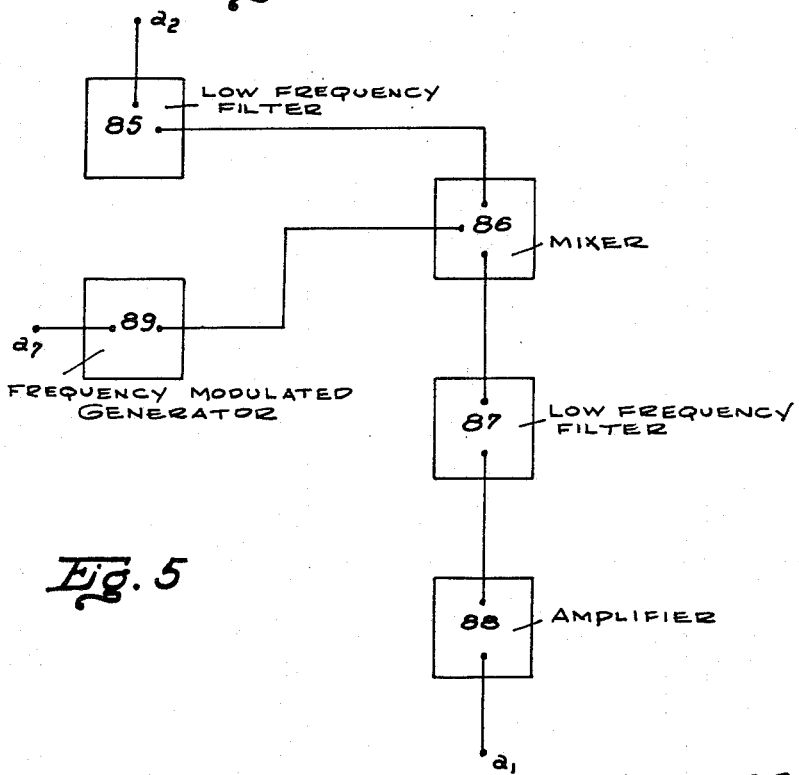

United States Patent Office 2,914,761
Patented Nov. 24, 1959

2,914,761

RADAR SYSTEMS

Jean Ortusi and André Robert, Paris, France, assignors to Compagnie Generale de Telegraphie Sans Fil, a corporation of France Application November 14, 1952, Serial No. 320,400

Claims priority, application France December 1, 1951

3 Claims. (Cl. 343—5)

This invention relates to radar systems, and more particularly to phase-modulated radar systems.

As is well known, the modulated electromagnetic energy transmitted in a radar system is supplied by an electronic tube, usually a magnetron or klystron tube to which the modulation signals are usually applied direct. Thus, in the usual pulsed type of radar system, a magnetron is fed with high voltage pulses and delivers direct to the transmitting aerial circuits ultra high frequency energy which is modulated "on and off" i.e. the high frequency waves are sent at full strength for a pulse length and then cut off for a pulse interval. In the so-called frequency modulated type of radar system, the radiated energy is usually supplied by a continuously oscillating reflex klystron tube the frequency of oscillation of which is varied i.e. modulated in pre-determined manner.

Both types of radar systems, pulsed and frequency modulated, involve the use of powerful electronic tubes which have to provide electro-magnetic energy distributed over a very wide frequency band. In practice, however, the width of band is limited by the width of the pass bands of the tubes themselves, for the problem of making powerful electronic tubes with very wide pass bands has not yet been solved. Accordingly, in known radar systems, it has been necessary to be satisfied with compromise performances much below the ideals required.

Moreover, it is very difficult in practice to stabilise the carrier frequency of the tubes employed, because they operate as modulated self-oscillators yielding energy extending over a wide frequency spectrum and therefore have to feed into load circuits of relatively low Q value.

These limitations result in numerous defects especially at the transmitter end of a radar system, for load impedance variations which depend on the pass band and mistuning effects in the antenna tend to disturb the reliability of operation and upset the characteristics of the wave radiated by the antenna.

Operating defects are also caused at the receiver end where it is necessary to use input circuits tuned to a mean frequency and having a pass band width much greater than necessary to accommodate the modulation band of the received wave. This results in increased noise level and consequent loss of sensitivity.

In addition, in those radar systems in which it is required to use the Doppler effect to select targets in terms of their radial velocity with relation to the system, it is necessary to use special so-called "coherent" transmitter receivers which are very costly and difficult to adjust.

The present invention seeks to avoid these disadvantages and to provide radar systems of simple form whereby moving targets can be selected in terms of their radial velocities.

According to this invention, a phase-modulated radar system comprises a very high frequency oscillator supplying energy to a first channel leading to a transmitting aerial, an electrically controlled modulator coupled to said channel, said modulator being adapted to introduce varying phase shift in the wave passing through said channel, a modulating signal generator electrically controlling said modulator, a second channel fed from said oscillator, and a detector fed from the second channel and also fed from a receiving aerial for echo signals, said detector being adapted to convert the said phase shift present in the received echo wave coming from the reflection into a signal which is employed to display a target.

In one embodiment the modulating signal generator for the modulator feeds the said modulator with short impulses so as to produce abrupt recurrent phase variations.

In another embodiment the said modulating signal generator for the modulator feeds it with a frequency modulated signal so as to produce phase modulation varying therewith.

The invention is illustrated in the accompanying drawings in which.

Figure 1:
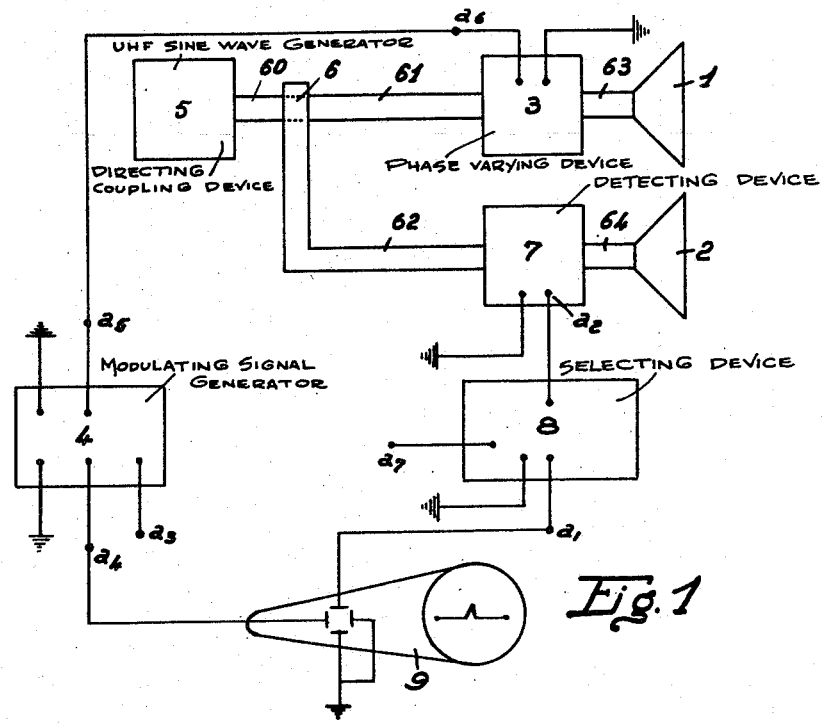
Figure 1 is a block diagram of one form of radar system embodying the invention.

Figures 4 and 5 show diagrammatically but in more detail, the device 8 of Figure 1 as used, in the case where (in Figure 1) the modulating signal generator 4 controls the modulator 3 respectively for pulse transmission (Figure 4) and for frequency modulated transmission (Figure 5).

The system represented in Figure 1 comprises a sinusoidal continuously operating ultra high frequency generator 5 supplying continuous sinusoidal oscillations to a wave-guide 60. The generator may be of any well known suitable type such as a klystron or magnetron arranged in the usual way. The guide 60 is coupled to a directional coupling element 6 arranged in accordance with known principles to prevent the production of stationary waves. The ultra-high frequency energy is thus branched off to two channels, the channel constituted by the guide 61 which takes most of the energy, and the channel constituted by guide 62 which receives a small portion of it. The ultra high frequency energy in these two guides or channels 61 and 62 is of substantially pure sinusoidal wave shape i.e. non-modulated. The guide 61 feeds into a modulator 3 which is controlled electrically by electrical control means 4 comprising, for example, a modulating signal generator. Under the action of the electrical signals delivered by generator 4, the modulator 3 impresses the ultra high frequency waves from guide 61 with a varying phase which is a time function of the controlling modulating signal wave form. The phase control or modulation is effected in such manner as to avoid any reflection of energy back to the generator 5. The phase modulated waves are fed through guide 63 to a transmission aerial 1 of known type.

Figures 2, 3:
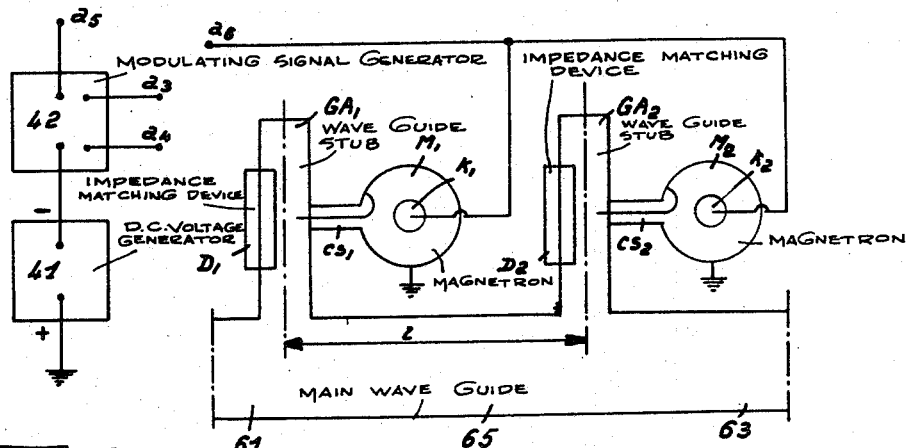
Figure 2 shows diagrammatically but in more detail the control means 4 of the system of Figure 1.
Figure 3 is a diagrammatic sectional view of the modulator 3 of Figure 1.

Referring to Figure 3, the modulator 3 of Figure 1 comprises a portion 65 of wave guide extending between the coupling guides 61 and 63 of Figure 1.

$GA_1$ and $GA_2$ are two wave guide stubs or sections inserted in series connection and there are two magnetrons $M_1$ and $M_2$ coupled respectively to the said two sections by probe couplers $CS_1$ and $CS_2$. The rectangles $D_1$ and $D_2$ represent impedance matching devices. The magnetic fields of the magnetrons $M_1$ and $M_2$ and the voltages applied thereto are so adjusted that these magnetrons are always blocked in the sense that they are not in self-oscillating condition. The magnetron cathodes $K_1$ and $K_2$ are heated by filaments fed in the usual way (not shown). When operated in this manner, the magnetrons constitute impedances the values of which are functions of the electrical voltages applied via connection $a_6$ between their cathodes and anodes.

It will be seen that the two voltage variable impedances thus provided are in effect in series with the guide portion 65. The distance $l$ separating the sections $GA_1$ and $GA_2$ is so chosen in accordance with known principles that it is possible by suitable adjustment of the values of the matching impedances $D_1$ and $D_2$ to insert the two said variable impedances while having a zero reflection coefficient near 61 with a transmission coefficient substantially equal to unity in modulus, but having a varying "argument." In other words, this modulator 3 operates under the control of the voltage applied at $a_6$, to introduce a variable phase shift in the wave transmitted from 61 towards 63 without producing any appreciable reflection back towards 61.

This well-known phase varying device of Figure 3, which is described in French Patent 1,036,847, filed on May 8, 1951, for: Electronic Phase Modulator for Centimetric Waves, by the present applicants, is equivalent to a variable reactance modulator, the said reactance comprising a blocked magnetron as also known in the art.

The voltage applied at $a_6$ (Figures 1 and 3) will generally be composed of a steady D.C. voltage supplied from a source 41 (Figure 2) superimposed on a varying voltage supplied by a modulating signal generator 42 (Figure 2), the said varying voltage being of a wave shape chosen in accordance with the nature of the modulation required to be supplied by the modulator 3.

The phase modulated wave fed to the aerial 1 from the guide 63, is propagated in space and, after reflection at a target, is received by the receiving aerial 2 and fed through guide 64 towards a detector unit 7 comprising the usual so-called "high frequency head" including a crystal detector. In this detector unit 7, the echo wave from the guide 64 is mixed wave energy fed through coupling 6 and guide 62. The output from unit 7 is a low frequency voltage which is a function of the characteristic of the modulation voltage produced by the generator 4 and applied to the modulator 3. The voltage from the generator 4 (Figure 1) is also applied at $a_4$ to provide one co-ordinate of deflection in the display cathode ray tube 9. The detector unit 7 feeds a low frequency selecting device 8 which serves to select the echoes and provides an output which is applied as the other co-ordinate of deflection to the tube 9 so that the said display tube produces a so-called A scan with echoes shown as "blips" whose distance from the origin of the trace is a measure of target range. This is conventionally indicated in Figure 1 on the face of the tube. The detailed nature of the selecting device 8 depends upon the form of the electric modulation signals supplied by the generator 4 (Figure 1) or 42 (Figure 2).

Two main cases are considered here, but they do not limit the invention which is equally applicable to other forms of selecting device.

In a first case, the generator 42 of Figure 2 delivers impulses of duration $t$ and repetition period T. In this case the phase of the emitted wave will be in effect impulse modulated, that is to say it will make abrupt changes in phase in the rhythm of the modulation. For this case, the selecting device 8 of Figure 1 may conveniently comprise, as shown in Figure 4, a low pass filter 81 adapted to select the Doppler frequencies due to echoes from moving targets, and a pass band filter 82 the pass band of which does not overlap that of filter 81 and the purpose of which is to select low frequency signals due to phase modulated wave echoes. Filters 81 and 82 are both fed with the low frequency output voltage from common output terminal $a_2$ of the detector unit 7 (Figure 1). The low frequency signals issuing from filter 81 are applied, after amplification by an amplifier 83, to a gated amplifier 84 which is rendered sensitive (i.e. "opens its gate") only when the receiver receives echoes due to moving targets, said amplifier 84 also receiving low frequency signals from filter 82. The gated amplifier 84 is connected at $a_1$ to the display tube oscillograph which thus displays targets as "blips" on the trace.

In the second case envisaged here, the generator 42 (Figure 2) delivers a sinusoidal wave which is frequency modulated according to a saw tooth law. This produces phase modulation of the ultra high frequency transmitted wave in which the transmitted frequency varies in accordance with a saw tooth law as well known in frequency modulated radar systems.

For this case, the low frequency selecting device 8 (Figure 1) may comprise as shown in Figure 5 a low frequency filter 85 which feeds into a mixing circuit 86 to which is also fed the output from a generator 89 supplying a sinusoidal voltage which is frequency modulated in accordance with a saw tooth law of different excursion from, but similar in shape to that used for the modulation of generator 42 (Figure 2). The terminal $a_3$ (Figure 1 and Figure 2) is connected to the terminal $a_7$ of the generator 89, the frequency modulation applied to generator 89 being also obtained from generator 4. After mixing in the mixer 86, the resulting signal is applied to a low frequency filter 87, and then to an amplifier 88 the signal from which is applied from terminal $a_1$ to the oscillograph 9 to produce the required display of echoes.

The mathematical explanation now to be given of the operation of the invention is believed correct, but the utility of the invention is, of course, not dependent upon whether it is so or not.

The generator 5 provides an unmodulated sine wave and is coupled to the aerial 1 via a channel including the electronic phase modulator 3 which modulates in accordance with the voltage applied at $a_6$. A portion of the high frequency energy goes over the coupling 6 to the receiver head 7 which accordingly receives two waves (one via reflection at a target) the relative phase of which is varied in time by the modulator 3.

After detection, a signal is obtained the amplitude of which is proportional to the amplitude of the wave reflected by a given target and the differentiation of which (as compared with other received signals) is obtained by phase modulation, the frequency of the signals depending upon the repetition frequency of the said modulation. Let $E_1 \cos \omega t$ be the amplitude of the transmitted wave; and $E_2 \cos (\omega t + \varphi + Kz)$ that of the received wave, where $\varphi$ is a function of time which depends upon the modulation process. The low frequency voltage detected is proportional to the expression:

$$E_1 E_2 \cos (\varphi + Kz) \qquad (1)$$

This is analogous to the expression for a voltage detected by the superheterodyne method, that is to say the amplitude is proportional to the amplitude of the high frequency wave and the frequency depends upon the frequency of phase modulation.

The differentiation between the emitted signals and the received signals as well as the differentiation of the latter depends upon the process of phase modulation.

By way of example, two particular processes of modulation will be described corresponding respectively to Figures 4 and 5 associated with Figure 1.

*Modulation in impulses*

Assume that z is the distance travelled by a transmitted wave to a target and back, the phase of said wave being modulated in impulses of width $t_1$ and the repetition period T.

In this case, the phase $\varphi$ will assume a value $\varphi = \varphi_1$ in the interval $0 < t_1$ and $\varphi = \varphi_0$ for the rest of the period. The detected current will be proportional to the expression $\cos (\varphi_1 + Kz)$ in an interval $0 < t < t_1$ and to the expression $\cos (\varphi_0 + Kz)$ in an interval $t_1 < t < T$, K being the propagation constant $$K = \frac{2\pi}{\lambda}$$

where $\lambda$ is the wave length). In these conditions an alternating current of period T will appear in the video amplifier circuits. The initial amplitude of the first harmonic is proportional to $\cos (\varphi_0 + Kz) - \cos (\varphi_1 + Kz)$, that is to say to $$\sin \frac{(\varphi_0 - \varphi_1)}{2} \cdot \sin \frac{(\varphi_1 + \varphi_0 + Kz)}{2} \qquad (2)$$

The amplitude of the signal is proportional to the resulting sine angle of the phase. When the target is of large dimensions as compared to the wave length, which is generally the case, the preceding calculations apply for each elementary portion of the target at a distance $z$ (between extreme values $z_0$ to $z_1$ for various portions of the target).

Assume $E_2(z)dz$ is the amplitude of the wave reflected by the portion considered. The initial amplitude of the first harmonic is proportional to the integral:

$$A = \int_{z_0}^{z_1} \frac{\sin \varphi_0 - \varphi_1}{2} E_2(z) \sin \left( Kz + \frac{\varphi_0 + \varphi_1}{2} \right) d_z \qquad (2')$$

When $z_0 - z_1$ is sufficiently large as compared to the wave length the integral is independent upon the fixed value $$\frac{\varphi_0 + \varphi_1}{2}$$

and can be written in the form $$A = a(z_1 - z_2) \sin \frac{\varphi_0 - \varphi_1}{2} \qquad (3)$$

where $a$ is the amplitude of the received wave without phase modulation.

Turning back now to Formula 1 and assume that the distance $z$ is a linear function of time we may write $$z = z_0 + vt$$

where $v$ is the radial speed of the target.

The variable component of the detected current is at every instant proportional to $$\cos (Kvt + \varphi + Kz_0)$$

It will be seen from this formula that this component (corresponding to the most frequent value $\varphi = \varphi_0$) is sinusoidal and its frequency $f$ is given by:

$$f = 2\frac{Kv}{2\pi} = 2\frac{v}{\lambda}$$

For instance, for a moving body with a radial speed $v$ of $$v = 300 \text{ m./s.}$$

and for $$\lambda = 10^{cm}; f = 6000$$

The frequency of this current must be sufficiently removed from harmonics of the impulse frequency to enable filters to separate the voltage due to the impulse from that due to target speed.

The advantage of this invention as compared to the known systems using amplitude modulation methods in the elimination of fixed target echoes is that it allows, with the use of no devices other than band filters, the separation of moving target from fixed target echoes.

In fact, from the preceding equations it will be seen that the signal components due to target movement occur all the time, since the transmission of the waves is continuous, and not only during impulses as is the case with amplitude modulation. This renders it possible to obtain a much stronger average alternating current.

The power required from an impulse producing device at 42 (Figure 2) is of the order of 1 watt at under 400 volts for a high frequency power of about one hundred watts. It will be seen from this example that large high frequency power can be modulated by quite weak modulating power. The filter 81 (Figure 4) is a low frequency low-band filter passing from 0 to 6000 periods. The filter 82 (Figure 4) is a band pass filter, passing in a practical case a band of about 6000 c./s. to 1 mc./s. (for impulses of 1 microsecond duration).

Variable frequency modulation

In this second method, there is applied to the modulator 3 (Figure 1) an alternating voltage of a constant amplitude but of a frequency $\alpha$ which increases linearly as a function of time during the repetition period T. This frequency $\alpha$ is assumed to be large as compared to the repetition frequency $$\Omega = \frac{2\pi}{T}$$

The expression for transmitted wave after modulation is therefore:

$$E = E_0 \cos (\omega t + k \sin \alpha t + \varphi_0) \qquad (4)$$

where $$\alpha = \alpha_0 + \beta \frac{t}{T}$$

for $nT < t < (n-1)T$, $n$ being an integer.

In this expression, the constant $k$ represents the modulation index. It is at most equal to $$\frac{\pi}{2}$$

It will be seen that the best choice of $k$ is for $1 < k < 2$ this is easily obtained in practice without the introduction of stationary waves.

The expression in Equation 4 may be developed in terms of sinusoidal frequency $\omega - \alpha$, $\omega + \alpha$, $\omega - 2\alpha$, $\omega + 2\alpha$, etc., and the equation is obtained:

$$E - \sum_{n=0}^{n=\infty} \pm a_n \cos [(\omega \pm n\alpha)t + \varphi_n]$$

with $$a_n = \int_h (k) E_0$$

As will be seen from what follows it is the first harmonics: $a_1 \cos [(\omega \pm \alpha)t + \varphi_1]$ which are interesting and it is therefore important to know the value of the index $k$ which makes these terms of maximum value. The development of Formula 4 shows that the maximum for the function $J_1(k)$ is attained when $k = 1.84$ and is equal to 0.54 i.e. approximately ½. This is approximately realised when $$k = \frac{\pi}{2} = 1.6$$

The wave transmitted by the transmitting aerial, after reflection at the target is superimposed in the mixing circuit 7 (Figure 1) on the unmodulated wave the form of which is $$E_1 \cos \omega t$$

The transmitted wave after modulation and reflection is of the form $$E_2 \cos (\omega t + k \sin \alpha t + \varphi_0 + Kz)$$

K being the constant of wave propagation.

It is decomposed into several harmonics the terms of which we consider only for $\omega \pm \alpha$ since the other terms will be eliminated after detection and filtering. As seen above, the expression of the terms for $\omega \pm \alpha$ is:

$$a_1 \cos [(\omega \pm \alpha)t + \varphi_1]$$

with $$a_1 = \frac{E_2}{2}$$

the expression becomes:

$$\frac{E_2}{2} \cos \left[(\omega+\alpha)t+\varphi_1+Kz\right]$$

In these conditions, the low frequency voltage of frequency $\alpha$ is after detection proportional to the expression:

$$E_1 E_2 \cos (\alpha t+\varphi_1+Kz) \quad (5)$$

It will be seen therefore that after detection and elimination of the harmonics of $\omega \pm n\alpha$ (with $n>1$), the expression for a sinusoidal oscillation of frequency and of amplitude linearly proportional to $E_2$ is obtained as in the case of detection by the heterodyning method.

The determination of the distance of the target is then carried out by a second mixer 86 operating at low frequency (Figure 5) and in which an oscillation the form of which is given by (5) is mixed with an oscillation of low frequency the expression for which is:

$$E_3 \cos (\gamma t+\varphi_3)$$

with $$\gamma = \gamma_0 + \delta \frac{t}{T}$$

This oscillation is delivered by generator 89 (Figure 5).

The constants $\gamma_0$ and $\delta$ are adjacent respectively to $\alpha_0$ and $\beta$ their difference, as will be seen, being the function of the performance required.

Following this mixer is a low frequency filter which passes only signals for which:

$$0 < (\alpha - \gamma) < \Delta \alpha$$

$\Delta \alpha$, or $\Omega_0$, being the pass band of the low frequency filter and is dependent also upon the results required.

Assuming a target at a distance $z$ (go and return i.e. distance travelled to the target and back) from the system, the propagation time of the high frequency wave will be $$\theta = \frac{2z}{c}$$

The two currents inputs to the mixing circuit are:

$$E_1 E_2 \cos [\alpha_{(t-\theta)} t + \varphi_1 + Kz] \quad (6)$$
$$E_3 \cos [\gamma_{(t)} + \varphi_3] \quad (7)$$

At the output of the mixing circuit, there will appear therefore a low frequency voltage of an amplitude proportional to $E_2$ and a frequency $u$ as given by the equation:

$$u = \alpha_{(t-\theta)} - \gamma_{(t)}$$

Developing this, one obtains:

$$u = \alpha_0 - \gamma_0 + (\beta - \delta)\frac{t}{T} - \beta \frac{\theta}{T}$$

The times $t$ which correspond to the currents passing through the filter 87 of Figure 5 are given by the values of $u$ comprised between the two limits of this filter. For instance, with a filter with a low frequency pass band extending from 0 to $U_0$, only the times $t$ satisfying the return.

$$0 < \alpha_0 - \gamma_0 + (\beta - \delta)\frac{t}{T} - \beta \frac{\theta}{T} < U_0$$

will give a signal on the oscillograph $U_0$ being small as compared to the values of $\alpha_0$ and $\gamma_0$.

If $t$ is comprised between $t_0$ and $t_1$ with $$t_0 = \frac{\beta \theta - (\alpha_0 - \gamma_0) T}{\beta - \delta}$$

$$t_1 = \frac{\beta \theta - (\alpha_0 - \gamma_0 - U_0) T}{\beta - \delta}$$

and $$t_1 - t_0 = \frac{U_0 T}{\beta - \delta}$$

$t_1 - t_0$ represents the width of the signal on the oscillograph. If $$\frac{T}{p}$$

is the resolution required one obtains $$U_0 = \frac{\beta - \delta}{p} \quad (8)$$

The average position of the signal is given by:

$$t_0 = \frac{\beta \theta - (\alpha_0 - \alpha_0) T}{\beta - \delta}$$

It is assumed for instance that $\alpha_0 = \gamma_0$ in any case $(\alpha_0 - \gamma_0)T$ will be small as compared to $\beta \theta$. For the position of the signal one gets $$t_0 = \frac{\beta}{\beta - \delta} \theta \quad (9)$$

Moreover, in order to obtain maximum signal to noise ratio it is necessary that the interval of time $t_1 - t_0$ should be equal to the inverse of the pass band $$\frac{U_0}{2\pi}$$

of low frequency filters and circuits.
Hence:

$$t_1 - t_0 = \frac{2\pi}{U_0} = \frac{U_0 T}{\beta - \delta} \quad (10)$$

The Formulae 8, 9, and 10 contain the essentials of the performances of radar with phase modulation.

It will be seen first of all from Formula 9 that the horizontal sweep in the oscillograph is in a linear relationship with the distance of the target.

The maximum distance $\theta_M$ (not taking into account sensitivity) is obtained when $t_0 = T$.

$$\theta_m = \frac{\beta - \delta}{\beta} T \quad (11)$$

For example take a maximum range of 45 km.

$$(\theta_M = 300 \ 10^{-6})$$

and a relative resolution in the distance measurement of $1/20$ ($p=20$). Adopt for $U_0$ the smallest possible value in order to obtain the best sensitivity. However, for practical reasons, $U_0$ cannot go below a certain value, for instance $U_0 = 3.000$ (1 kc. of band width).

From these three assumptions, the Equations 8, 9 and 10 determine the other constants.

First of all, Equation 8 determines $\beta - \delta$.

$$\beta - \delta = U_0 \quad p = 120 \ 10^{-3}$$

Equation 10 gives the period T:

$$T = \frac{2\pi}{U_0} = \frac{1}{50}$$

Equation 11 gives $\beta$ $$\beta = \frac{(\beta - \delta) T}{\theta_m} = \frac{120 \ 10^3}{50.300 \ 10^{-6}} = 8.10^6$$

Coming back now to the definition of the first frequency $\alpha$:

$$\alpha = \alpha_0 + \beta \frac{t}{T}$$

It will be seen that $\beta$ represents the depth of modulation at this frequency. Assuming a modulation depth of 10%, it is necesary that $\alpha_0 = 80 \ 10^6$ i.e. a frequency modulation by the phase shifting magnetrons M equal to 13 megacycles.

The characteristics of this example of radar system will therefore be:

*Low frequency pulsations*

(a) Alternating voltage at the phase modulator 200 volts, 13 megacycles, 10% frequency modulated.

(b) Alternating voltage at the local oscillator 10 volts, 13 megacycles, 9.5% frequency modulated.

Sweep frequency—50 periods per second.
Receiver pass band—1 kilocycle.
Maximum projection distance—45 km.
All these requirements are easily satisfied.

The minimum range $\theta_m$ is obtained by dividing $\theta_M$ by $p$. It is 2 kilometres. If it is desired to obtain a smaller minimum range, the resolution may first be increased ($p=50$ for example). It may also be possible to make use of a higher sweep frequency $$\left(T = \frac{1}{500} \text{ for instance}\right)$$

In this latter case, the maximum distance is also reduced. It is therefore necessary to provide two operating positions of adjustment, one for near targets and the other for distant ones, with a different sweep period in each. If the sweep period is to be maintained constant, the value $\beta - \delta$ can be reduced by correcting the modulation depth of the local low frequency oscillator.

We claim:

1. A radar system for transmitting and receiving phase modulated signals, comprising: an ultra high frequency oscillator for generating substantially sinusoidal wave energy; a first channel for feeding said wave energy to a transmitting aerial; an electrically controlled modulator in said channel for phase modulating said wave energy for obtaining phase modulated signals; a modulating signal generator for controlling said modulator; a mixing detector; and means for feeding to said detector a portion of said energy before modulation thereof and echos of said signals.

2. A radar system for transmitting and receiving phase modulated signals; comprising: an ultra high frequency oscillator for generating substantially sinusoidal wave energy; a first channel for feeding said wave energy to a transmitting aerial; an electrically controlled modulator in said channel for recurrently shifting the phase of said wave energy; means for controlling said modulator, said means comprising a pulse amplitude modulated generator; a mixing detector having a first and a second output, means for feeding to said detector a portion of said energy before modulation thereof and echoes of transmitted signals; a low pass filter connected to said first output for selecting the Doppler frequencies signals from moving targets and having an output; an amplifier connected to said output and having an output; a gated amplifier having a first and a second input and an output, said first input being connected to said output of said amplifier; a pass band filter connected to said second output of said detector for selecting the echo signals and connected to said second input of said gated amplifier an indicator circuit, said output of said gated amplifier being connected to said circuit.

3. A radar system for transmitting and receiving phase modulated signals, comprising; an ultra high frequency oscillator for generating substantially sinusoidal wave energy; a first channel for feeding energy of said wave energy to a transmitting aerial; an electrically controlled modulator in said channel for countinuously phase modulating said wave energy for obtaining phase modulated signals; means for controlling said modulator, said means comprising a first generator for providing a first signal frequency modulated according to a saw tooth law; a mixing detector having an output; means for feeding to said detector a portion of said energy before modulation thereof and echos of said signals; a low frequency filter connected to said output; a second generator for providing a second signal frequency modulated according to a saw tooth law having the same period as the saw-tooth modulation period of said first signal, and having a frequency deviation different therefrom; and a mixer fed by said low frequency filter and said second generator for feeding a second low frequency output filter.

References Cited in the file of this patent

UNITED STATES PATENTS

| | | |
|---|---|---|
| 2,479,568 | Hansen | Aug. 23, 1949 |
| 2,517,549 | Earp | Aug. 8, 1950 |
| 2,532,157 | Evans | Nov. 28, 1950 |
| 2,542,182 | Crump | Feb. 20, 1951 |
| 2,591,919 | Collard | Apr. 8, 1952 |
| 2,631,278 | Kiebert | Mar. 10, 1953 |